United States Patent [19]

Takeda

[11] Patent Number: 5,301,268
[45] Date of Patent: Apr. 5, 1994

[54] APPARATUS FOR TRANSFERRING INFORMATION BETWEEN DIFFERENT WINDOW SYSTEMS

[75] Inventor: Masaru Takeda, Saitama, Japan
[73] Assignee: Fuji Xerox Co., Ltd., Tokyo, Japan
[21] Appl. No.: 595,878
[22] Filed: Oct. 10, 1990
[51] Int. Cl.$^5$ .............................................. G06F 3/14
[52] U.S. Cl. ..................................... 395/157; 395/700
[58] Field of Search ............................. 395/155–161, 395/700; 340/706, 710, 721, 724, 723

[56] References Cited

U.S. PATENT DOCUMENTS 5,157,763 10/1992 Peters et al. ..................... 395/157

OTHER PUBLICATIONS

Gross, "Ingres Adds Windows 4GL", Computer Reseller News, May 7, 1990, p. 75(2) Summary.
Young, Douglas, *X Window Systems: Programming and Applications with Xt*, M.I.T., 1989, pp. 1–42.
Scott McGregor and Michael Collins, "Easy Windows", Systems Integration, Oct. 1989.
Jones, Oliver, *Introduction to the X Window System*, M.I.T., 1989, pp. 27–64.
"*Microsoft Windows User's Guide*", Microsoft Corp., 1987, pp. 131–134, 59–74, 83–93.
Treadway, Richard, "Working With Windows", Computer Graphics World, Sep. 1988, pp. 79–86.

*Primary Examiner*—Gary V. Harkcom
*Assistant Examiner*—John E. Breene
*Attorney, Agent, or Firm*—Finnegan, Henderson, Farabow, Garrett & Dunner

[57] ABSTRACT

An information transferring system operating in an information processing system capable of performing highly efficient and reliable exchanges of data between two or more windows respectively operating on different window systems without the necessity of changing the window systems, using a data area in the form of a clipboard or a similar memory area specified for temporary data storage and transferring the data for such exchanges by way of an exclusive-use communication line or a shared memory medium, with or without the use of selection protocols, thereby achieving further improved reliability and higher efficiency in the data exchanging operations between window systems and application programs operating within the window systems.

11 Claims, 9 Drawing Sheets

APPARATUS FOR TRANSFERRING INFORMATION BETWEEN DIFFERENT WINDOW SYSTEMS

BACKGROUND OF THE INVENTION

1. Field of the Invention

The present invention relates to information processing equipment such as workstations and more particularly, to an information transferring system designed to exchange data among different window systems and to display the different window systems on a display screen of a display apparatus.

2. Discussion of the Related Art

Along with the progressive utilization of information processing systems and equipment, such as workstations, the use of multiple window systems on these workstations has become increasingly popular. Multiple window systems are systems constructed to display a plurality of windows on the same display. The use of a multiple window system makes it possible to perform a plurality of processing operations on one display screen as set in correspondence with the individual windows and to perform such operations as the transfer of picture images in an efficient way by the use of a plurality of windows.

For the display of a plurality of windows on the display screen of a display apparatus, the windows are operated by either a single system in some cases or by a plurality of systems in other cases. In the former case, one processing program operates a plurality of windows shown on the display screen, however, in the latter case, a plurality of processing programs operate the respective windows displayed on one display screen.

FIG. 16 illustrates one example of a screen displaying multiple windows operated by a plurality of processing programs. The display screen 11 on the display unit shows a window 12 generated on the display screen by a first window system and another window 13 generated on the display screen by a second window system. Since the first window system and the second window system are different systems, their processing functions will be different between a case where the cursor (not illustrated in the Figure) is present, for example, inside the window 12 and another case in which the cursor is present inside the other window 13.

Even with a multiple window system like the one described, users demand improvements in the manner in which the systems operate with emphasis on the ease and efficiency in the preparation of documents. For example, users require a multiple window system capable of copying or moving the data of a document, a line drawing, or the like, inside one window 12 to the field inside the other window 13.

In the latter case described above, however, the window systems themselves are different and it is usually the case that such different processing systems have many differences including, for example, differences in character codes, differences in the control code for the display of characters, and differences in the process of producing line drawings. Therefore, unlike the case of the transfer of data in a multiple window system operated by a single processing system, where each of a plurality of processing programs operates the display of a window on the display screen simultaneously users require the capacity to perform exchange data among such different window systems.

Consequently, an information processing system capable of operating a plurality of window systems has been provided with a data storing area called a "clipboard". Thus, for the transfer of data from one window system to a different window system, the data to be transferred is first written to a clipboard by the first window system and subsequently the second window system may read out the data stored on this clipboard. This process allows for the exchange of data between different window systems.

Disadvantageously, in the ordinary case, only one such clipboard is provided in the area of the window systems. Accordingly, in case it is designed to put different window systems into operation at the same time, such individual window systems will independently control the clipboard. Presently, the individual window systems execute the operation of a clipboard, specifying some addresses in the memory area from time to time, depending on the data to be processed on each particular occasion For this reason, even if a given window system has stored data in the memory medium on a clipboard at addresses starting with the address a, another window system is not able to gain any knowledge of this address a, so that it is virtually impossible to perform the exchanges of data between different window operating systems.

The above description details the exchange of data by a process using a clipboard, but it is noted that problems have also been found with the exchange of data by a process using selection. The difference between a clipboard and a selection process is described below.

When using a clipboard, the processing system which transfers data specifies the clipboard as a site for the transfer and retrieval of the data and stores the data on the specified clipboard. The processing system which requires the data searches the clipboard and retrieves the data from it.

However, when using the selection process, the processing system which requires data accesses to the processing system which maintains the data and requests the data. The system which maintains the data searches for the required data and stores the data found by such a search in a prescribed storing location, via which the data is delivered to the processing system requesting the data.

When data exchanges are performed by such a selection process between different window systems, even if a window system requiring some data accesses the window system which maintains the data requesting the data, such a request is made by a different system, and the window system which has the requested data cannot understand the request (or demand) because the two systems are different in their data format and so forth. Therefore, it is impossible to exchange data by the use of the protocol called "selection" between different window systems.

SUMMARY OF THE INVENTION

The present invention has been made in view of the above circumstances and has as a first object the offer of an information processing system which is capable of performing the exchange of data by using a clipboard without making any change in the window systems.

A second object of the present invention is to offer an information processing system which is capable of performing the exchanges of data by using a selection process without making any change in the window systems.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, the information transferring system in an information processing system comprising a central processing unit capable of performing the operations associated with processes including application programs, window systems and the transfer of data within the information processing system, a system memory capable of storing the application programs, window systems and data, a display apparatus having a display screen, a plurality of window systems each having a window system memory in said system memory for storing data and being capable of concurrently displaying a plurality of windows including data on said display screen, capable of performing the transfer of data between the plurality of windows displayed by the plurality of window systems according to the present invention comprises a transfer source data designating means, coupled to a first window system of the plurality of window systems, for designating data displayed on a first window of the first window system to be transferred, a transfer source data storing means, coupled to the transfer source data designating means, for storing the data designated by the transfer source data designating means in the window system memory of the first window system, a data communicating means, coupled to the first window system and a second window system of the plurality of window systems specified as the destination of the data transfer, for transferring the data stored in the window system memory of the first window system by the transfer source data storing means to said second window system, a transfer destination data storing means, coupled to the second window system, for storing the data transferred by the data communicating means in the window system memory of the second window system, a data writing designating means, coupled to the second window system, for designating the location on a first window displayed by the second window system where the data stored by the transfer destination data storing means should be displayed, and a data writing means, coupled to the data writing designating means, for displaying the data stored by the transfer destination data storing means on the first window displayed by said second window system at the location designated by the data writing designating means.

That is, the present invention performs the exchange of data, using a data area in the form of a clipboard, and attains the objects described above by first storing the data designated for their transfer in a memory area within the same window system, transferring the designated and stored data by the data communicating means to a memory area in another window system which is the destination for the data transfer, and reading the data thus transferred and writing the data to a window as desired.

In this regard, the data communicating means may be such a means which performs the communication of data by way of a communication line or may be such a means which performs transfers of data between different window systems by writing such data to and reading such data from a memory medium with a storing position fixed in advance. Further, it is conceivable that the memory area which stores the data intended for a transfer thereof, or the memory areas in both of the systems, can be formed into a clipboard.

The present invention also accomplishes the objects described above by making the selection of the data for transfers in a relevant window operated by a different window system demanded to transfer the data, giving a notice of the completed selection of the data to the window operated by the window system which has made the demand for the selection of the data, conveying a data transfer demand made, on the basis of this notice of the completed selection of the data, by the window which has demanded the selection of the data to the window which has made the selection of the data, and by thus having the window which has selected the data transfer the data to the window which has made the demand for their transfer and is hence the destination of the data transfer.

In this respect, the information processing system uses the protocol called "selection" in making the exchanges of data. The communications of the exchanged data may be performed on an exclusive-use communication line, or may alternatively be performed by way of a shared memory medium.

Another aspect of the present invention is that the information processing system using a selection protocol, and one window system which has made a selection of the demanded data gives the other window system a notice of the completed selection of the data. Upon completion of the data selection, and the other window system which has thus received the notice, still remaining in the state just described, makes a declaration within its own window system to the effect that a selection has been made of the data, thereby preventing the occurrence of any other state of data selection within the same window system and thereby ensuring the unfailing transfer of the selected data.

BRIEF DESCRIPTION OF THE DRAWINGS

The accompanying drawings, which are incorporated in and constitute a part of this Specification, illustrate embodiments of the present invention and, together with the description, serve to explain the objects, advantages and principles of the invention. In the drawings:

FIG. 1 presents a block diagram showing an outline of the circuit construction of an information processing system capable of being used with the information transferring system according to the present invention;

FIG. 2 is a plan view illustrating one example of the particulars put on display on the screen of the display unit for the embodiment of the information transferring system according to the present invention;

FIG. 3 presents a block diagram illustrating the construction of an information transferring system according to an embodiment of the present invention;

FIG. 4 presents a flow chart illustrating the flow of the actual control operations performed in a case in which data ar transferred from the first A application block to the second A application block;

FIG. 5 is a plan view illustrating one example of the state of the display screen when a demand has been made for the transfer of data;

FIG. 6 is a plan view illustrating one example of the state of the display screen when operations are performed at the side of the window belonging to a second window system;

FIG. 7 is a plan view illustrating one example of the state of the display screen when the data has been transferred;

FIG. 9 presents a block diagram showing the construction of the information transferring system in the second example of the preferred embodiment according to the present invention;

FIG. 10 presents a chart illustrating the manner how exchanges of data are performed between windows in one window system;

FIG. 11 presents a flow chart illustrating the procedure to be followed in preparation for the transfer of data;

FIG. 12 presents a flow chart illustrating the procedure for the control operations for the transfer of data after the completion of the preparations for the transfer of data;

FIG. 13 presents a block diagram illustrating the construction of an information transferring system which makes use of files on a magnetic disk for the transfer of data in a first modified example of the second example of the preferred embodiment according to the present invention shown in FIG. 9;

DETAILED DESCRIPTION OF THE INVENTION

Figure 1:
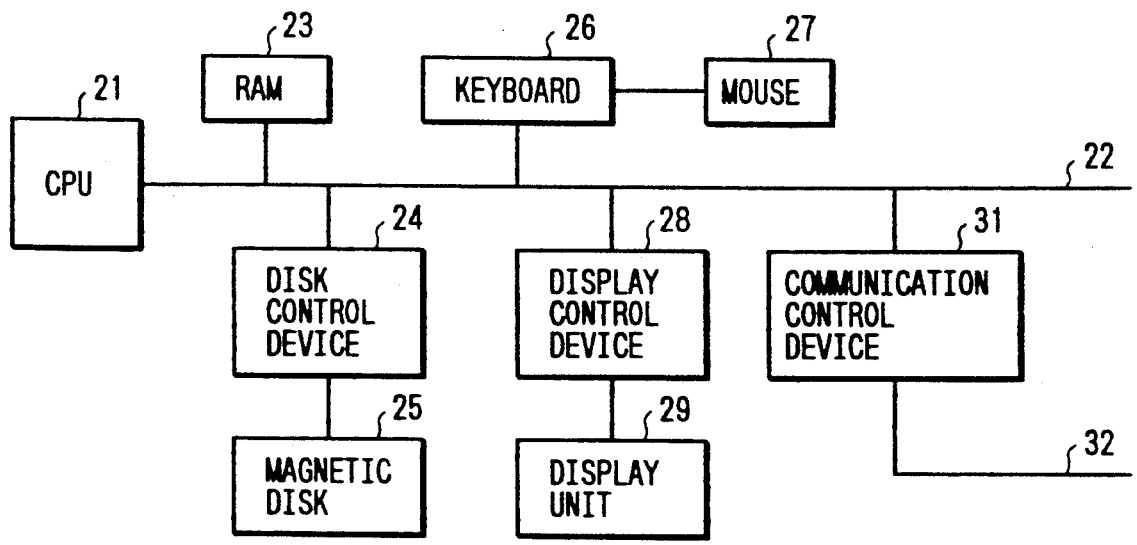
FIGS. 1 through 7 illustrate a first example of the preferred embodiment of the present invention.
Figure 16:
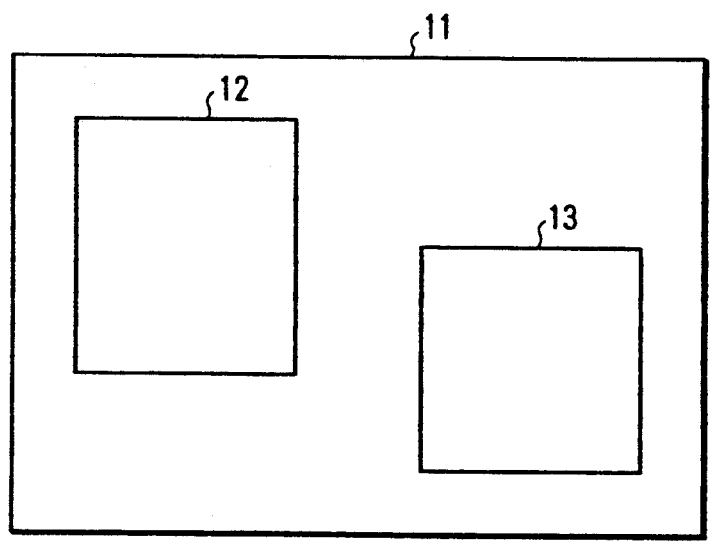
FIG. 16 shows a plan view illustrating one example of the display screen in a multiple window system.

The present invention will now be described in detail with reference to the accompanying drawings, in which like reference characters designate like or corresponding parts throughout the several drawings.

FIG. 1 illustrates the information processing system in this first example of the preferred embodiment of the present invention;

The information processing system in this first example of the preferred embodiment is provided with a central processing unit (CPU) 21, which is connected with various types of circuit devices by way of a bus 22, such as a data bus. Of these devices, the random access memory device (RAM) 23 is the main memory device, which temporarily stores the programs and various kinds of data.

The disk control device 24, which is connected with a magnetic disk 25, is designed, for example, to perform the reading of the programs stored in the magnetic disk 25 and the writing of the document produced with the system. In addition to, or instead of, the magnetic disk 25, another external memory device may be used. The keyboard 26 is a device which is used for performing input operations on its keys, and a mouse 27 for its use as a pointing device can be connected with this keyboard 26.

The display control device 28 is designed to control the display unit 29, which is composed of a cathode ray tube (CRT) and so forth, and this display control device 28 has a built-in screen memory device (not illustrated in the Figure). A communication control device 31 is designed to perform the input and output of the necessary data, being connected with other equipments, such as workstations and printers, for example, by way of a cable 32, which forms a local area network.

Figure 2:
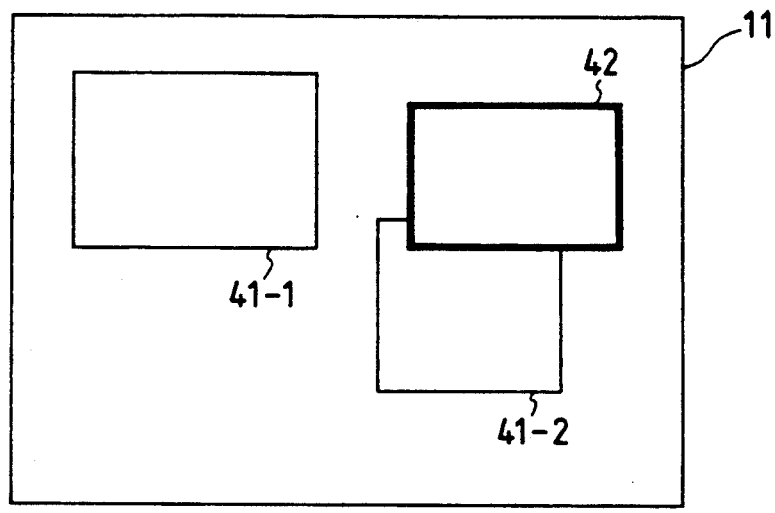

FIG. 2 illustrates on example of particular windows displayed on the display screen of the display unit 29 of the information processing system shown in FIG. 1. On the display screen 11 are displayed a first window 41-1 and a second window 41-2 of a first window system and also a window 42 of a second window system. In this drawing, the second window 41-2 and the window 42 overlap with each other, but this state does not influence the control of the information control system according to the present invention.

Figure 3:
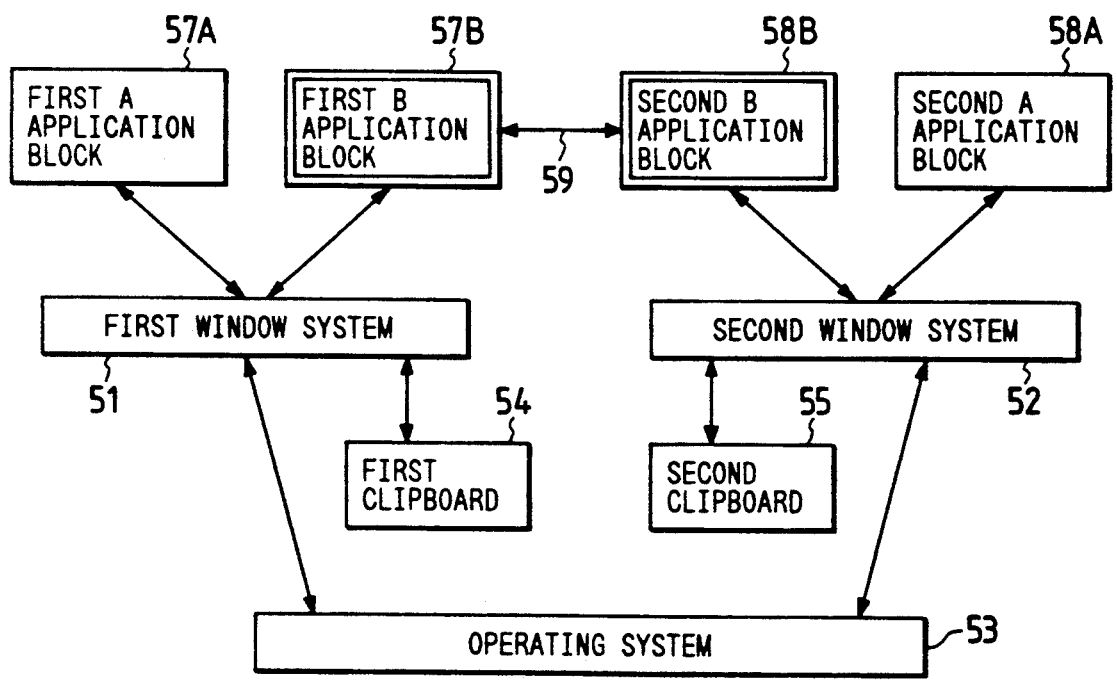

FIG. 3 illustrates the construction of the information transferring system according to the present invention. In this information transferring system, the first window system 51 and the second window system 52 are designed to operate on a common operating system 53. The first window system 51 is provided with a first clipboard 54 for its exclusive use for this system while the second window system 52 is provided with a second clipboard 55 for its exclusive use for the second system.

The first window system 51 is provided with a first A application block 57A which operates on this system while the second window system 52 is provided with a second A application block 58A which can operate on this second window system. In this regard, the respective application blocks 57A and 58A are the programs to be executed for performing known processes, such as the processes for editing data, on the corresponding window systems 51 and 52, respectively.

In this first example of the preferred embodiment, the first window system 51 is additionally provided with a new first B application block 57B while the second window system 52 is additionally provided with a new second B application block 58B. These application blocks 57B and 58B are respectively used for securing an execution path 59 between these two blocks at the time of their execution.

Now, it is assumed that a transfer of data is to be performed from the first A application block 57A in the first window system to the second A application block 58A in the second window system. In this case, the first application block 57A performs the writing of the data to the first clipboard 54. Next, the first B application block 57B reads out the data from the clipboard 54. This data is transferred via an execution path (communication line) 59 secured in advance to the second B application block. The second B application block 58B, having thus received the transferred data, writes the data to a second clipboard 55, which is arranged at the side of the second window system 52. The second A application block 58A, essentially receives the data by reading out the data stored on the second clipboard 55.

That is to say, the information transferring system in this first example of the preferred embodiment performs the writing and reading of the data with the first clipboard 54 within the sphere of the first window system 51 and performs the writing and reading of the data with the second clipboard 55 within the sphere of the second window system 52.

The transfer of data from the second A application block 58A to the first A application block 57A is realized by following a procedure entirely reverse to what has been described above.

Figure 4:
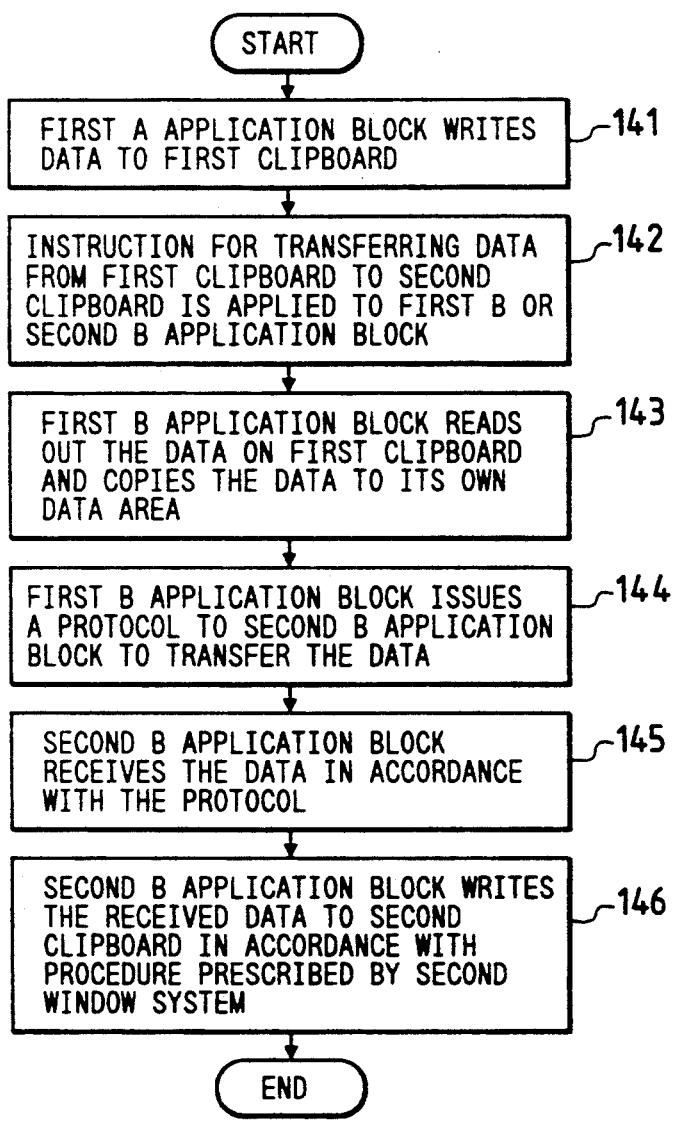

FIG. 4 illustrates the flow of the actual control operations in a case where data is transferred from the first A application block to the second A application block.

The first A application block 57A will write the data to the first clipboard 54 (Step 141) when a demand has been made of the second window system 51 for a transfer of the data.

Figure 5:
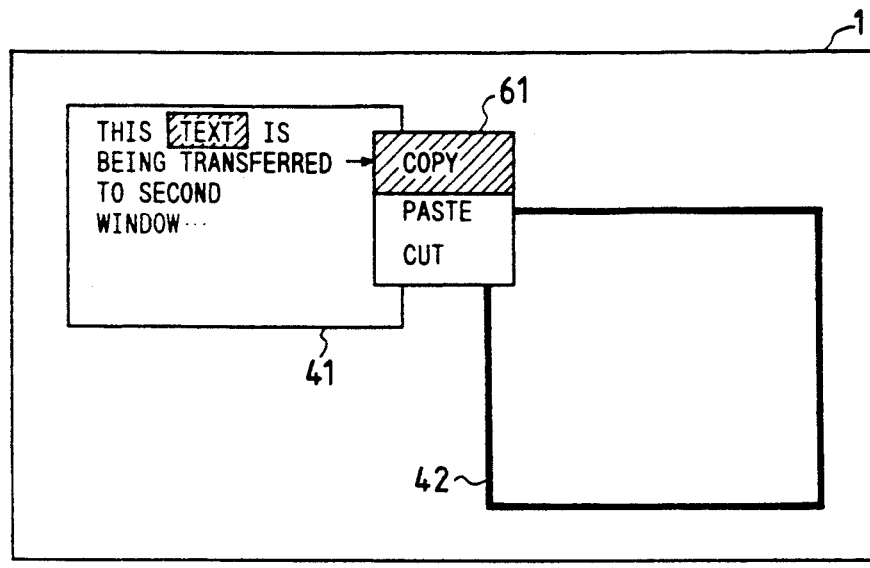

FIG. 5 illustrates one example of the state of the screen in the phase in which such a demand has been made for the transfer of data. In this example, the display screen 11 shows the window 41 of the first window system and the window 42 of the second window system. The first window 41 shows a message "This TEXT is being transferred to the second window . . . ". It is assumed here that the operator, having opened a pop-up menu window 61 and pushing the prescribed button by means of the mouse 27, has demanded that the word "TEXT" should be copied to the window 42.

Here, the term, "copy," which is put on display on the pop-up menu window 61 means an operation for writing the data to the clipboard, and the term, "cut," means the operation for moving the data to the clipboard. Also, the term, "paste," means the operation for reading the data from the clipboard and writing the data to a prescribed position in the field. Thus, in this case, the operator selects the term, "copy," and thereby instructs the system to perform the job for writing the word, "TEXT," to the first clipboard 54.

In this manner, the word "TEXT," in the first window 41 will be written to the first clipboard 54. Moreover, the word "TEXT," which is thus taken as the object of a transfer of data, will be indicated in highlight (for emphasis) when it is selected for the transfer process.

Upon the completion of the operations described above, the central processing unit (CPU) 21 (FIG. 1) gives instructions for the transfer of the data written to the first clipboard 54 to the second clipboard 55 (Step 142). These instructions are given to the first B application block 57B in the same window system 51 or to the second B application block 58B of the different window system 52.

Subsequently, the first B application block 57B reads out the data stored on the first clipboard 54 and copies the data to its own data area (Step 143). Next, the first B application block 57B issues to the second B application block 58B a protocol relevant to the transfer of the data for the word, "TEXT" (Step 144).

The second B application block 58B, having thus received this protocol, receives the data in accordance with the protocol (Step 145). Subsequently, the second B application block 58 will write the received data to the second clipboard 55 in accordance with a process prescribed by the second window system 52 (Step 156).

Figure 6:
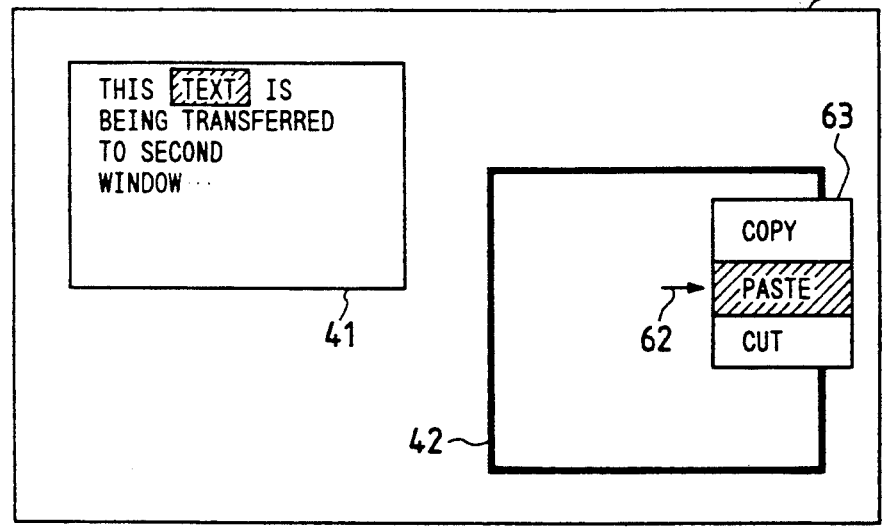

FIG. 6 illustrates the manner of operations performed at the side of the window belonging to the second window system. Even if the operator has specified the data to be copied, as shown in FIG. 5, it is possible that several windows are set up on the display screen 11. In such a case, the operator moves the cursor 62 to the window 42, which should be the destination to which the specified data should be copied, and then, opening the pop-up menu window 63, gives instructions on the manner how the job should be carried out. In this case, the system reads out the data written to the second clipboard 55 and writes the data to a position specified for it in the window 42, and accordingly the job "paste" is specified here.

Figure 7:
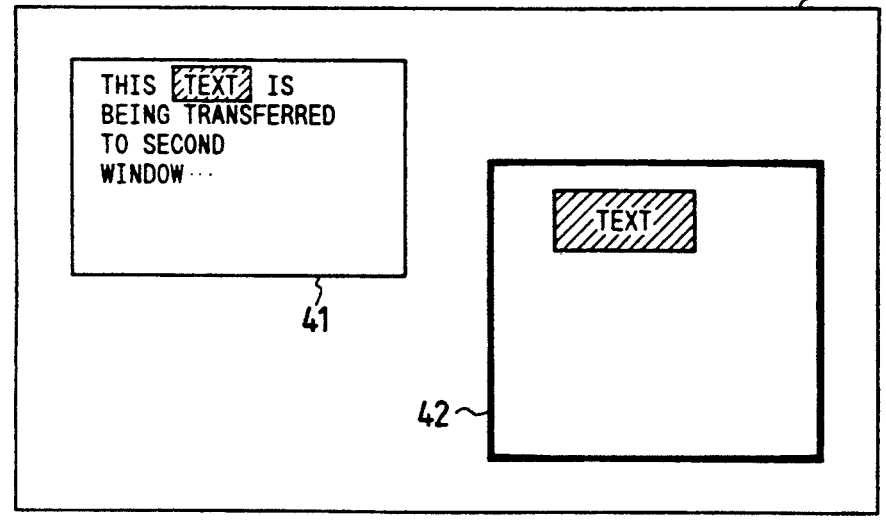

FIG. 7 illustrates the state in which the data have been copied to the window belonging to the second window system as the result of the operating instructions on the job as described above. It is clearly observed here that the word, "TEXT," has been copied to the desired position in the window 42.

As it is clearly understood in light of the description given of the operations in FIG. 5 through FIG. 7, the operator will be able to perform the operations for the transfer of data without becoming conscious at all of the performance of the data transfer between the two clipboards 54 and 55, even in a case in which a transfer of data is performed between the different window systems 51 and 52.

Figure 8:
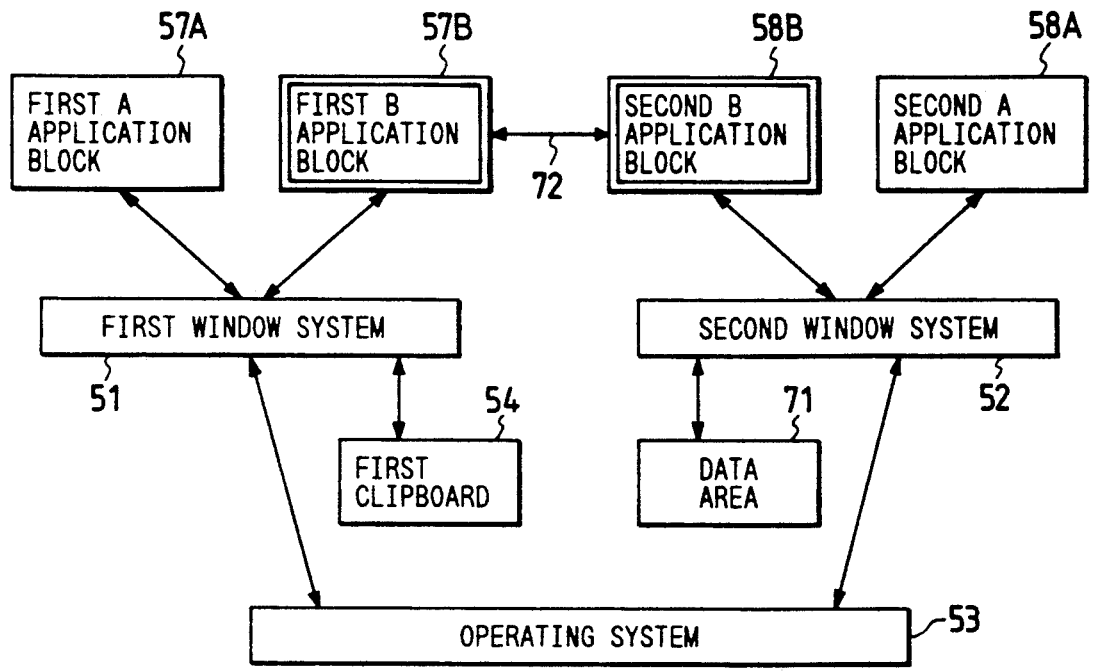
FIG. 8 is a block diagram illustrating the construction of the information transferring system in a modified example of the preferred embodiment of the present invention shown in FIG. 3.

FIG. 8 illustrates the construction of the information transferring system in a modified form of the first example of the preferred embodiment of the present invention. In this modified form of the first example of embodiment, the second window system 52 is not provided with any clipboard. Instead, the second window system 52 has a data area 71, which works in place of a clipboard.

In this modified example, a transfer of data from the first A application block 57A to the second A application block 58A is performed first by storing the data for the transfer on the first clipboard 54, and, with respect to this operation, this modified example is identical to the first example of the preferred embodiment described above. After this, the data reaches the second B application block 58B by way of the communication line 72, and the data is taken from this application block and stored on the data area 71, from which the data are subsequently read by the second A application block 58A out of the data area 71. Here, the term, "data area," means an area in such a storage device as a magnetic disk or a random access memory device (RAM) as specified between window systems with different memory areas.

Although, an execution path (or a communication line) 72 is used for the transfer of data in the first example of the preferred embodiment and the modified form of the first example, a file or a shared memory may be used, so that the transfers of data between the two window systems may be performed by writing the data to and reading the data from such a file or such a shared memory.

Figure 9:
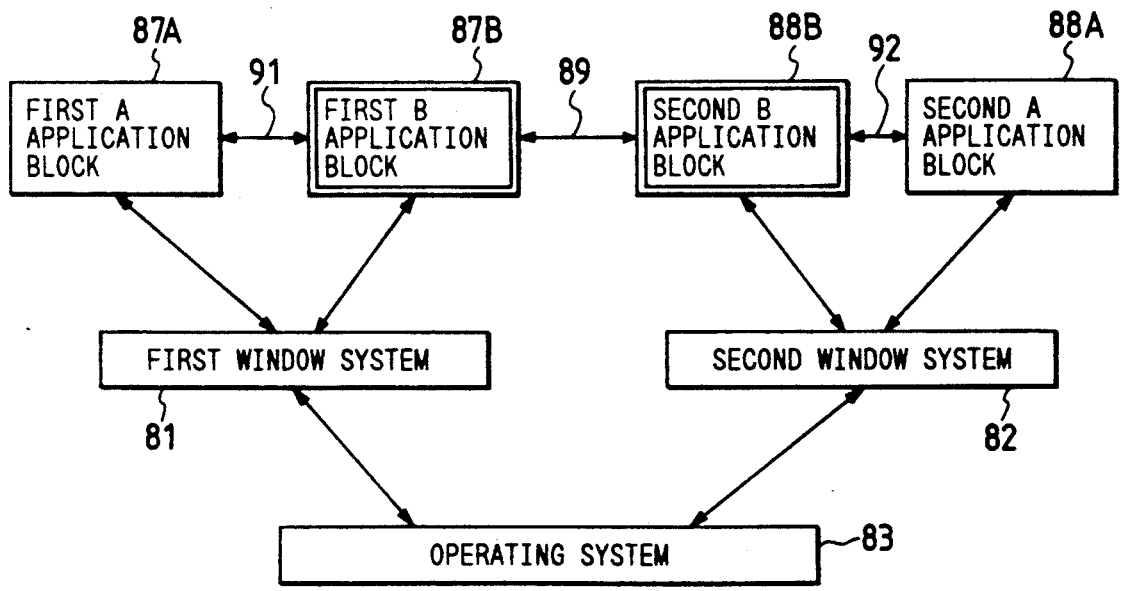
FIGS. 9 through 13 illustrate a second example of the preferred embodiment of the present invention.

FIG. 9 illustrates the construction of the information transferring system in a second example of the preferred embodiment according to the present invention. In this regard, the circuit construction of the information processing system in this second example of the preferred embodiment is basically the same as that of the first example of the preferred embodiment illustrated in FIG. 1. However, the magnetic disk 25 shown in FIG. 1 stores the program for the selection protocol.

Also the information transferring system in this second example of the preferred embodiment is designed in such a manner that a first window system 81 and a second window system 82 operate on a common operating system 83.

The first window system 81 is provided with a first A application block 87A, which operates on this system, and the second window system 82 is provided with a second A application block 88A, which can operate on this second window system. Here, the respective application blocks 87A and 88A are programs which execute the known processes, such as those of editing, on the corresponding window systems 81 and 82.

In this second example of the preferred embodiment, a new first B application block 87B and a new second B application block 88B are arranged on the first window system 81 and the second window system 82, respectively. These application blocks 87B and 88B respectively secure a communication line 89 between them at the time of their execution. Also, a communication line 91 for carrying a selection protocol defined by the first window system 81 is arranged between the application block 87A and the application block 87B. In the same manner, a communication line 92 for carrying a selection protocol defined by the second window system 82 is arranged between the application block 88A and the application block 88B.

For a better understanding of the information transferring system described above, a description is given first of a transfer of data performed between systems on one window system.

Figure 10:
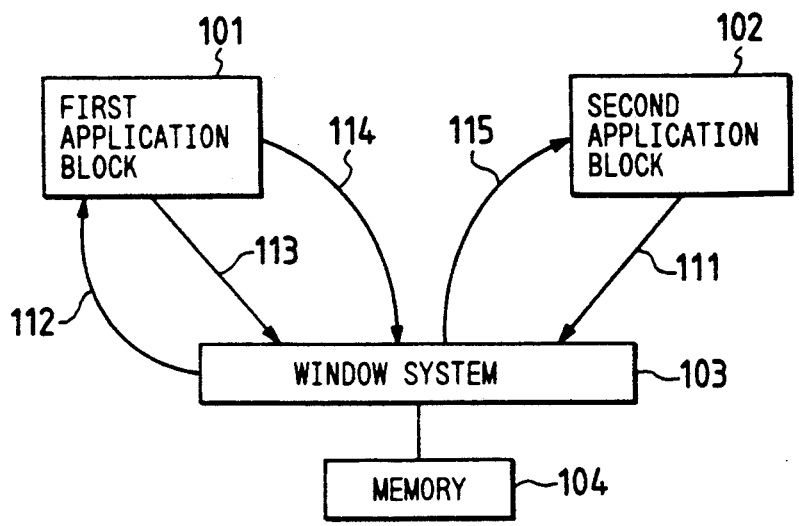

FIG. 10 illustrates one example of the exchange of data between windows in one window system. A first application block 101 and a second application block 102 are designed to operate on the same window system. A memory device 104 is kept under the control by this window system 103.

Now, it is assumed that a transfer of data is performed from the first application block 101 to the second application block 102 on a window system constructed in this manner. In this case, the second application block 102 issues a protocol (prescribed code of communication procedures) 111 to the window system 103 in demand of data.

On the basis of this protocol, the window system 103 issues a protocol (or message) 112 to the first application block 101, thereby giving a notice that the other application block 102 has made a demand for data. The first application block 101, responding to this protocol, issues a protocol 113 for the transfer of the relevant data to the memory 104 kept under the control by the window system 103 and also issues to the window system 103 a protocol 114 which indicates that the first application block 101 itself has the data to be taken up as the object of the data transfer.

The window system 103 issues a protocol 115 for the transfer of the data written to the memory 104 to the second application block 102, which has made a demand for the data.

The exchange of data made by a selection process as just described will be performed in the state wherein the window system 103 is present between two application blocks 101 and 102. The selection protocol is determined by definition by the window system 103 on which the application blocks 101 and 102 operate. Therefore, where the same application block is operated on different window systems, it will be necessary to change the protocol for the selection process into a selection protocol for a new window system.

With this understanding of a transfer involving one window system the following description of FIG. 9 can be appreciated. For this second example of an embodiment, the exchanges made of data between the first A application block 87A and the first B application block 87B and the exchanges made of data between the second A application block 88A and the second B application block 88B are as already described with reference to FIG. 8.

Next, a description is given of a case in which a transfer of data is performed from the first A application block 87A to the second A application block 88A.

Figure 11:
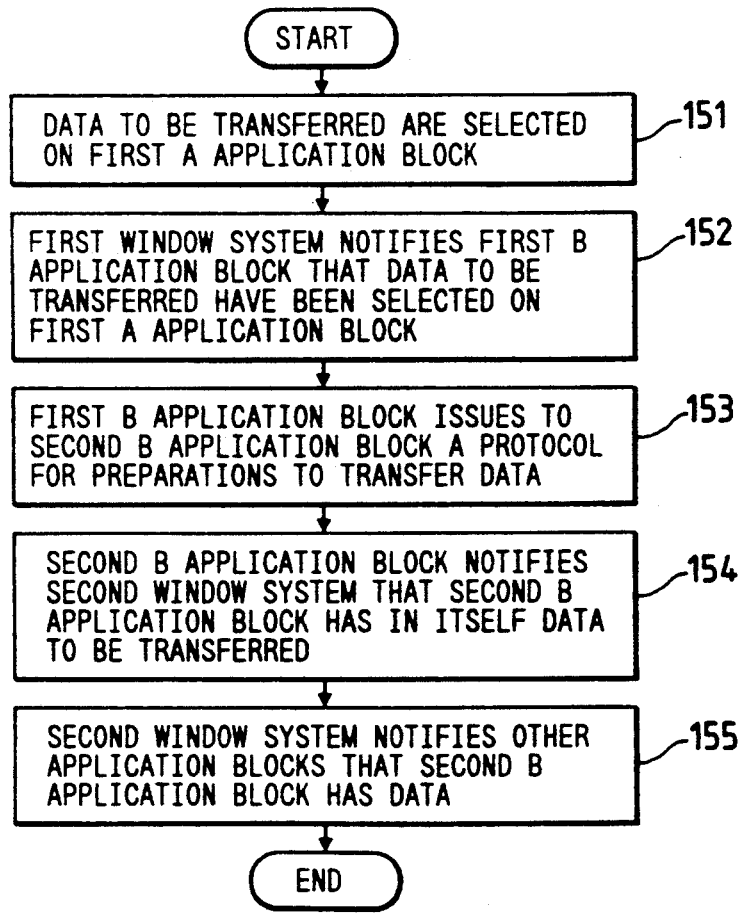

FIG. 11 illustrates the procedure to be followed in preparation for such a transfer of data. As described above, the first A application block 87A selects the relevant data (Step 151) when the second A application block 88A makes a demand for the transfer of data. Then, the first window system 81 informs the first B application block 87B that the first A application block 87A has made the selection of the data to be transferred (Step 152).

The first B application block 87B issues a protocol for the preparations for the transfer of the data to the second B application block 88B, which operates on a different window system (Step 153). The second B application block 88B gives the second window system 82 a notice that the second B application block 88B itself has the data to be transferred (Step 154). When this notice is given, the second B application block 88B has not yet actually received the data. However, since there is a risk in that an unforeseen transfer of data may be made between systems on the second window system 82, this information processing system is designed in such a manner that a preliminary notice is thus given in order to prevent such a situation.

The second window system 82 notifies the other application blocks of the fact that the second B application block 88B has the data (Step 155).

Figure 12:
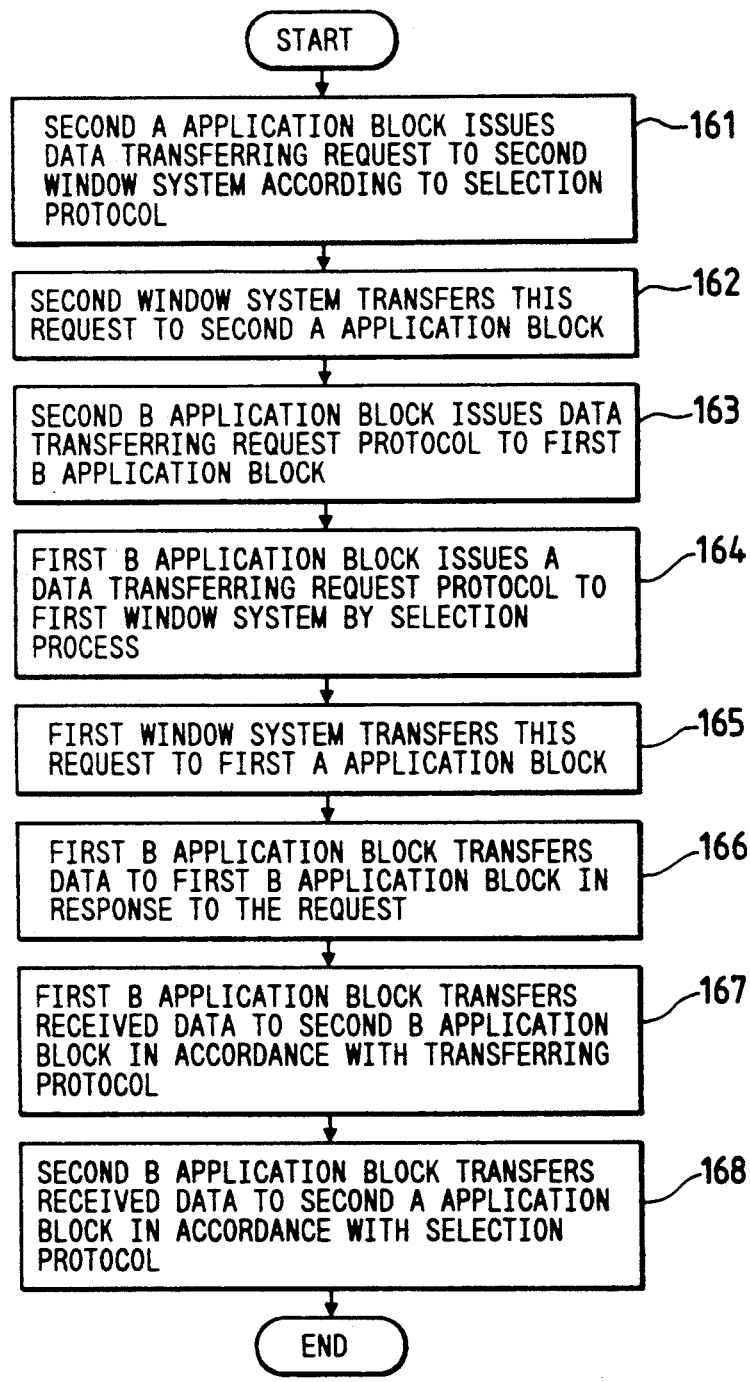

FIG. 12 presents the procedure for the control operations which should be performed for the transfer of data after the preparations for the transfer of data have been made in this manner. With the notice given in Step 155 shown in FIG. 11, the second A application block 88A recognizes that the second B application block 88B has the data. Therefore, the second A application block 88A issues the selection protocol to the second window system 82, thereby making a demand for the transfer of the data (Step 161). The second window system 82 assumes, on the basis of the processes at the preparatory stage, that the second B application block 88B holds the data and therefore forwards this demand to the second application block 88B (Step 162).

The second B application block 88B does not yet actually hold the data, at the moment when it receives this demand thus forwarded to it, and therefore makes a demand of the first B application block 87B of the transfer of the data (Step 163). In order to receive the actual data, the first B application block 87B issues to the first window system 81 a selection protocol which this system defines (Step 164).

The first window system 81 knows that the first A application block 87A holds the data. Accordingly, the first window system 81 conveys the above-mentioned demand for the data to the first A application block 87A (Step 165). The first A application block 87A, responding to this demand, transfers the data it possesses to the first B application block 87B by a procedure established by the selection protocol (Step 166).

The first B application block 87B, which has thus received the data, transfers the data to the second B application block 88B by using a communication line 89 secured in advance (Step 167). The second B application block 88B, which has received the data in this manner, transfers the data to the second A application block 88A in accordance with the selection protocol defined by the second window system 82 (Step 168).

Table 1 below illustrates one example of basic commands used between the application blocks in the manner described above.

TABLE 1

| Command | Transmitted by | Received by | Operation |
| --- | --- | --- | --- |
| Demand for data | First B application block | Second B application block | Issues a selection protocol for the transfer of data held by the second A application block to the second B application block. |
| Demand for data | Second B application block | First B application block | Issues a selection protocol for the transfer of data held by the first A application block to the first B application block. |
| Data format | First B application block | Second B application block | Converts the data format required by the first A application block into a format that can be recognized by the second A application block. |
| Data format | Second B application block | First B application block | Converts the data format required by the second A application block into a format that can be recognized by the first A application block. |

In the second example of the preferred embodiment described above, a communication line is used to exemplify a means for the transfer of data. Those skilled in the art will recognize, however, a variety of other means capable of performing data transfer in a manner similar to the communication line.

Figure 13:
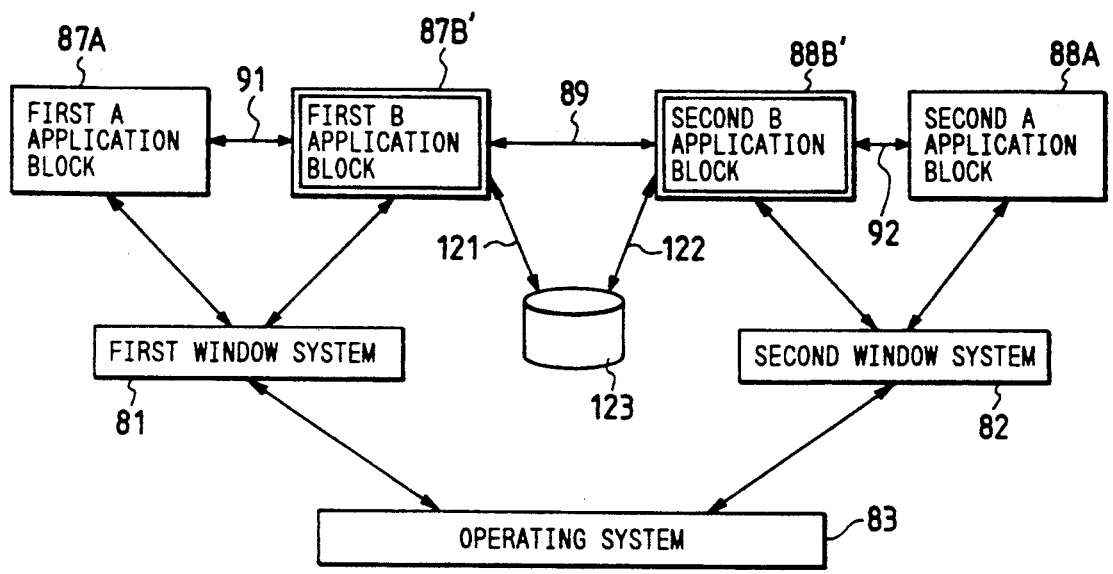

FIG. 13 illustrates a first modified form of the second example of the preferred embodiment in which a file on a magnetic disk is used for the transfer of data in the information transferring system. In specific terms, in the information processing system in this first modified form of the second example of the preferred embodiment, a first window system 81 is installed thereon with a first A application block 87A and a first B application block 87B', both of which operate on this first window system 81, and a second window system 82 is installed thereon with a second A application block 88A and a second B application block 88B', which can operate on this second window system 82.

Between the first B application block 87B' and the second B application block 88B', the prescribed files located on a magnetic disk 123 are connected, via a writing means 121 and a reading means 122, in addition to a communication line 89 used by these application blocks. Also, between the first A application block 87A and the first B application block 87B' is arranged a communication line 91 operated by a selection protocol defined by the first window system 81, and between the second A application block 88A and the second B application block 88B' is arranged a communication line 92 operated by a selection protocol defined by the second window system 82.

In the above-described information transferring system in the first modified form of the second example of the preferred embodiment, the protocols are transmitted by the use of the communication line 92, and the contents of the data are exchanged using files on the magnetic disk 123.

Figure 14:
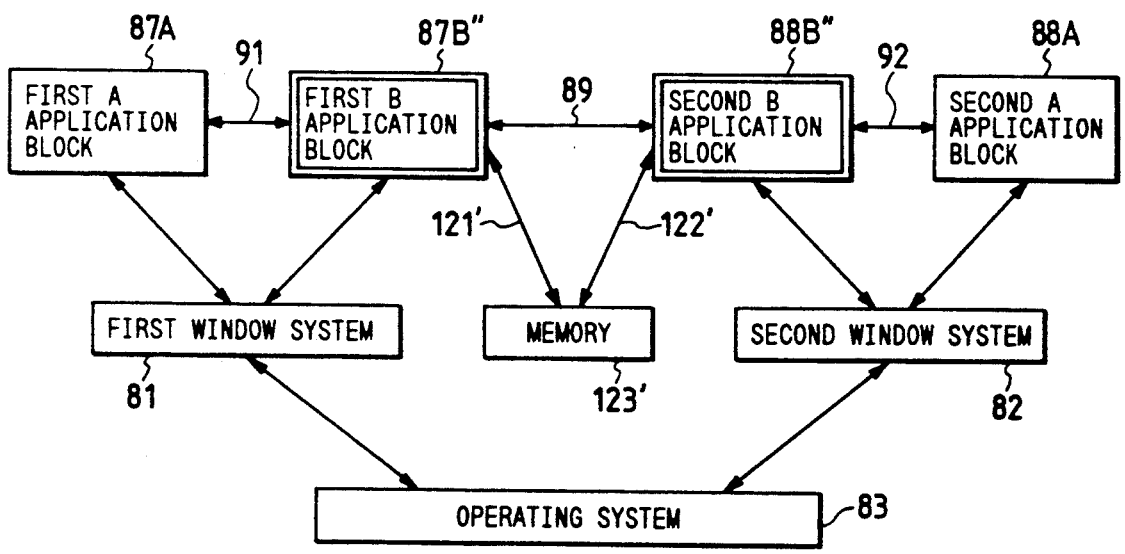
FIG. 14 presents a block diagram illustrating the construction of an information transferring system which makes use of a shared memory device for the transfer of data in a second modified example of the second example of the preferred embodiment of the present invention shown in FIG. 9.

FIG. 14 illustrates an information transferring system in a second modified form of the second example of the preferred embodiment of this invention. In the information processing system in this second modified form, a first window system 81 is installed thereon with a first A application block 87A and a first B application block 87B", both of which operate on this first window system 81 and a second window system 82 is installed thereon with a second A application block 88A and a second B application block 88B", both of which operate on this second window system.

Between the first B application block 87B" and the second B application block 88B", a shared memory device 123', such as a random access memory (RAM), is connected via a writing means 121 and a reading means 122, in addition to a communication line 89, which is used by these application blocks. Also, between the first A application block 87A and the first B application block 87B" is arranged a communication line 91 operated by a selection protocol defined by the first window system 81, and between the second A application block 88A and the second B application block 88B" is arranged a communication line 92 operated by a selection protocol defined by the second window system 82.

In the above-described information transferring system in the second modified form of the second example of the preferred embodiment, the protocols are transmitted by the use of the communication line 92, and the contents of the data are exchanged through utilization of the shared memory 123'.

Now, with respect to the step 154 shown in FIG. 11, which illustrates the operations of the information transferring system in the second example of the preferred embodiment, the second B application block 88B informs the second window system 82 that the application block 88B itself holds the data to be transferred, although the application block 88B has in fact not yet actually obtained the particular data.

The multiple selection protocols, even if merely subjected to their protocol conversion, would simply result in the presence of a plurality of selected positions at the same time. Therefore, unless the notice mentioned above is not given, it would not be distinct which of the positions is the really selected position, with the result that there would arise a confusion.

Therefore, in this third modified form of the second example of embodiment, the system is designed to be capable of avoiding such a trouble without any special change made of the window system.

Figure 15:
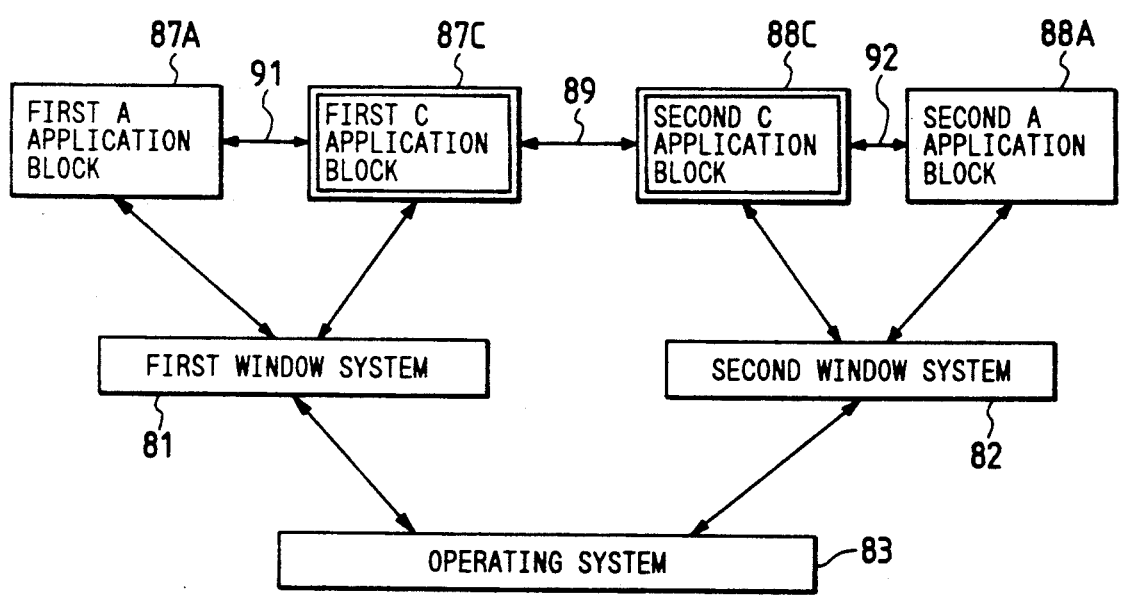
FIG. 15 presents a block diagram illustrating the construction of an information transferring system in a third modified example of the second example of the preferred embodiment of the present invention shown in FIG. 9.

FIG. 15 illustrates the construction of an information transferring system in a third modified form of the second example of the preferred embodiment of the present invention. Moreover the circuit construction of the information processing system in this modified form of the second example is basically identical to that described in the second example of embodiment shown in FIG. 9, and the same parts are therefore indicated by the same reference characters. In this third modified form of the second example of embodiment, a first C application block 87C, which is operated by a first window system 81, and a second C application block 88C, which is operated by a second window system 82, are designed to make the exchanges of data by the use of the commands shown on Table 2 below. A communication line 89 is designed for its use for both the communications of the commands and the transfer of data between the first C application block 87C and the second C application block 88C.

cancellation of selection, as shown in the lowermost column on Table 2, via the communication line 89.

When receiving this command the first C application block 87C declares to the first window system 81 to the effect that data has been newly put into a selected state in order that the state of selection of data in the first A application block 87A will be canceled thereby. Upon this declaration, the first window system 81 gives a notice on the cancellation of the data selection to the first A application block 87A.

Thus, the apparent possession of the data is shifted from the first A application block 87A to the second A application block 88A, making it possible for the system to control the operations in such a manner that there is only one unit of data in the selected state in the system as a whole.

As described herein, the present invention may provide an information processing system comprising a display screen unit such as a cathode ray tube (CRT) display unit; a different system window concurrent display means, which displays on the display screen unit

TABLE 2

| Command | Transmitted by | Received by | Operation |
| --- | --- | --- | --- |
| Demand for data | First C application block | Second C application block | Issues a selection protocol for the transfer of data held by the second A application block to the second C application block. |
| Demand for data | Second C application block | First C application block | Issues a selection protocol for the transfer of data held by the first A application block to the first C application block. |
| Data format | First C application block | Second C application block | Converts the data format required by the first A application block into a format that can be recognized by the second A application block. |
| Data format | Second B application block | First C application block | Converts the data format required by the second A application block into a format that can be recognized by the first A application block. |
| Cancellation of selection | First C application block | Second C application block | Declares that the second C application block is the holder of the selection in the second window system. |
| Cancellation of selection | Second C application block | First C application block | Declares that the first C application block is the holder of the selection in the first window system. |

Now, this information transferring system has the characteristic feature that the data in the selected state is always in a single system. Of the commands presented on Table 2, the two commands relating to the "cancellation of selection" are used to warrant this state.

For example, it is assumed here that the data under the control by the first A application block 87A shown in FIG. 15 is in a selected state. Then, the second C application block 88C makes a declaration to the effect that data has been selected in the second window system 82. By the effect of this declaration, the selection of data in the second window system 82 is canceled.

If it is assumed now that a selection has been made of data in the second A application block 88A, this second A application block 88A makes a declaration to the second window system 82 to the effect that data has been put in a newly selected state. With this declaration, the second window system 82 gives the second C application block 88C a notice of the cancellation of selection. In this state, both the first A application block 87A and the second A application block 88A could be considered as the holders of the data. Therefore, the second C application block 88C issues the command for the a plurality of windows operated by different window systems; a transfer source data designating means, which designates the data to be transferred within a specified area inside a window in one window system; a transfer source data storing means, which stores the data designated by this transfer source data designating means in a memory area within the same window system; a data communicating means, which transfers the data stored in this transfer source data storing means to the window system to which the window which is the destination of the transfer belongs; a transfer destination data storing means, which stores the data transferred by this data communicating means in the memory area in this window system thus receiving the transfer of the data; a data writing designating means, which designates the location where the data should be written in the window which is the destination for the transfer of the data; and a data writing means, which performs the writing of the data read out of the transfer destination data storing means in accordance with a designation by this data writing designating means.

Further, the present invention may also provide for an information processing system comprising: a display screen unit such as a cathode ray tube (CRT) display unit; a different system window concurrent displaying means, which displays on the display screen unit a plurality of windows operated by different window systems; a data selection demanding means, which demands the selection of data present in a window operated by a window system different from its own window system; a data selecting means, which makes a selection of the demanded data for their transfer in a relevant window on the basis of such a demand made by this data selection demanding means; a communicating means, which gives a notice of the completed selection of the demanded data, upon the selection of the data by this data selecting means, to the window which has demanded the selection of the data; a transfer demand conveying means, which notifies the window which has made the selection of the data of a demand for the transfer of the data, which the window that has demanded the selection of the data make when this communicating means has thus given a notice of the completed selection of the data; and a data transfer means, which transfers the data to the window which is the destination of the demanded data transfer in accordance with the data transfer demand made by the transfer demand conveying means defined above which executes several mutually independent applications operated on different window systems, opening communicating means among such applications and making exchanges of data by using such communicating means. Therefore, the information processing system according to the present invention is capable of making the exchanges of data among different window systems without changing their respective data exchanging processes even if unique processes are established independently for the exchanges of data for the individual window systems.

Moreover, the information transferring system proposed by the present invention offers the advantageous effect that the system is capable of performing the exchanges of data promptly, in case such exchanges of data are performed via an exclusive-use communication line, and also performing the transfers of data among different window systems without any synchronization, provided that the transfers of data are made by way of a memory medium.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information transferring system in an information processing system having a central processing unit for performing operations associated with application programs and different window systems within the information processing system, a system memory for storing the application programs, the different window systems and data associated with each of the application programs, a display apparatus having a display screen, wherein each of the different window systems has an information exchanging system and a window system memory in said system memory for storing data and for concurrently displaying a plurality of windows including data on said display screen, and wherein said information exchanging system transfers data between the plurality of windows displayed by each of the different window systems, the information transferring system comprising:

transfer source data designating means of a first window system of the different window systems, for designating data to be transferred, wherein said designated data is displayed on a first window of said first window system;

transfer source data storing means, coupled to said transfer source data designating means, for storing the data designating by said transfer source data designating means in a window system memory of said first window system;

data communicating means, coupled to said first window system and a second window system, which has an information exchanging system that is different from the information exchanging system of the first window system and is specified as a destination window system, for transferring the data stored in said window system memory of said first window system by said transfer source data storing means to the window system memory of said second window system;

data writing designating means, of said second window system, for designating a location of a first window displayed by said second window system where the data transferred by said data communicating means and stored in the window system memory of said second window system should be displayed; and data writing means, coupled to said data writing designating means, for displaying the data stored in said window system memory of said second window system on said first window displayed by said second window system at the location designated by said data writing designating means.

2. The information transferring system according to claim 1 wherein said system includes communication line means for connecting the different window systems and wherein said data communicating means transfers the data stored in said window system memory of said first window system by said transfer source data storing means to said window system memory of said second window system via the communication line means.

3. The information transferring system according to claim 1 wherein said system includes a memory medium having a plurality of positions for storing the data and wherein said communicating means transfers the data stored in said window system memory of said first window system by reading the data from a first predetermined position of the plurality of positions in said memory medium and writing the data to a second predetermined position of the plurality of positions in said memory medium, wherein the second predetermined position is in the window system memory of said second window system.

4. The information transferring system according to claim 1 wherein said system memory includes a plurality of clipboards and said window system memory of said first window system is a first one of the plurality of clipboards and the system memory of said second window system is a second done of the plurality of clipboards.

5. The information transferring system according to claim 1 wherein said system memory includes a plurality of clipboards and wherein said window system memory of said first window system and said window system memory of said second window system is a first one of the plurality of clipboards.

6. An information transferring system in a data processing system including a display apparatus having a display screen and a central processing unit for performing operations associated with different window system including managing a display of a plurality of windows on the display screen, wherein each of said different window systems uses a different process to manage the display of the plurality of windows on said display screen, the information processing system comprising:
   concurrent window system display means for displaying on said display screen a plurality of windows operated by the different window systems;
   data identifying means for identifying data displayed in a first window displayed by a first window system of the different window system selected by a second window system which is different from the first window system;
   data selecting means, coupled to said data identifying means, for selecting the data identified by said data identifying means for transfer to a first window of the plurality of windows displayed by said second window system;
   communicating means for notifying the second window system that selection of the selected data has been completed by said data selecting means;
   transfer demanding means, responsive to said notice from said communicating means, for transferring a demand to the first window system having made the selection of the selected data from the second window system having selected the selected data, wherein said demand initiates the transfer of the selected data; and
   data transferring means for transferring the selected data to the first window of the second window system specified as a destination window system of the selected data transferred in accordance with the demand made by the transfer demanding means.

7. The information transferring system according to claim 6 wherein said data transfer between said first window system and said second window system is performed by a predetermined selection protocol having information necessary to facilitate said data transfer.

8. The information transferring system according to claim 6 wherein said different window systems are connected by communication lines means for facilitating communication between the window systems, and wherein said data transfer between said first window system and said second window system is performed via the communication line means.

9. The information transferring system according to claim 6 wherein the different window systems are connected to a shared memory medium and said transfer of data between said first window system and said second window system uses said shared memory medium.

10. The information transferring system according to claim 6 wherein said communicating means notifies, upon completion of the identification of the selected data by said first window system, the second window system of the completed identification of the selected data, and wherein said information processing system further comprises:
   declaring means for declaring in the second window system the completion of the data selection and when said notice is received by said second window system, said second window system remains in an operation prior to reception of the transfer of the data.

11. An information transferring system in an information processing system having a central processing unit for performing operations associated with application programs, window systems and an information exchanging system, a system memory for storing the application programs, window systems and data, a display apparatus having a display screen, the window systems each having a window system memory in said system memory for storing data and for concurrently displaying on said display screen a plurality of windows including data, wherein each of said windows is associated with a one of the application programs, and wherein said information exchanging system performs a transfer of data between the application programs associated with said plurality of windows displayed by each of the window system, the information transferring system comprising:
   transfer source data designating means, of a first window system of the plurality of window systems, for designating data displayed on a first window of said first window system by a first application program;
   transfer source data storing means, coupled to said transfer source data designating means, for storing the data designated by said transfer source data designating means in the window system memory of said first window system;
   data communicating means, coupled to said first window system and a second window system of the window systems, which has an information exchanging system that is different from the information exchanging system of the first window system and is selected as a destination of the data transfer, for transferring the data stored in said window system memory of said first window system by said transfer source data storing means to the window system memory of said second window system;
   data designating means, coupled to said second window system, for designating a location on the first window displayed by said second window system where the data transferred by said data communicating means and stored in the window system memory of said second window system is to be displayed; and
   data writing means, coupled to said data designating means, for displaying the data stored in said window system memory of said second window system on said first window of a second application program displayed by said second window system at the location designated by said data designating means.

* * * * *

UNITED STATES PATENT AND TRADEMARK OFFICE
CERTIFICATE OF CORRECTION

PATENT NO. : 5,301,268
DATED : April 05, 1994
INVENTOR(S) : Masaru Takeda

It is certified that error appears in the above-indentified patent and that said Letters Patent is hereby corrected as shown below:

Claim 4, Column 16, Line 67 "done" should read --one--.

Claim 6, Column 17, Line 11 "system" should read --systems--.

Claim 6, Column 17, Line 22 "system" should read --systems--.

Claim 11, Column 18, Line 27 "system" should read --systems--.

Claim 11, Column 18, Line 50 "the" should read --a--.

Signed and Sealed this

Tenth Day of January, 1995

Attest:

BRUCE LEHMAN

*Attesting Officer*  *Commissioner of Patents and Trademarks*